United States Patent
Trikalinou et al.

(10) Patent No.: US 10,783,281 B2
(45) Date of Patent: Sep. 22, 2020

(54) SYSTEMS, METHODS, AND APPARATUS FOR COMBATTING DIRECT MEMORY ACCESS ATTACKS

(71) Applicant: Intel Corporation, Santa Clara, CA (US)

(72) Inventors: Anna Trikalinou, Hillsboro, OR (US); Daniel S. Lake, Hillsboro, OR (US); Shigeki Tomishima, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 244 days.

(21) Appl. No.: 15/926,082

(22) Filed: Mar. 20, 2018

(65) Prior Publication Data
US 2019/0042802 A1    Feb. 7, 2019

(51) Int. Cl.
*G06F 21/79*    (2013.01)
*G06F 21/55*    (2013.01)
*G06F 21/75*    (2013.01)

(52) U.S. Cl.
CPC ............ *G06F 21/79* (2013.01); *G06F 21/554* (2013.01); *G06F 21/75* (2013.01)

(58) Field of Classification Search
CPC ........ G06F 21/79; G06F 21/554; G06F 21/55; G06F 21/75
See application file for complete search history.

(56) References Cited

U.S. PATENT DOCUMENTS

| | | | | |
|---|---|---|---|---|
| 6,209,071 B1* | 3/2001 | Barth | ...................... | G06F 13/16 711/167 |
| 2003/0210600 A1* | 11/2003 | Koo | ......................... | G11C 7/20 365/226 |
| 2012/0306551 A1* | 12/2012 | Moon | .................... | H03L 7/0814 327/149 |
| 2016/0239663 A1* | 8/2016 | Healy | .................... | G06F 21/554 |
| 2018/0018461 A1* | 1/2018 | Shin | ......................... | G06F 21/53 |

OTHER PUBLICATIONS

Wikipedia, "Memory controller", accessed Feb. 10, 2018, 4 pages, https://en.wikipedia.org/wiki/Memory_controller.

(Continued)

*Primary Examiner* — Ashokkumar B Patel
*Assistant Examiner* — William B Jones
(74) *Attorney, Agent, or Firm* — Trop, Pruner & Hu, P.C.

(57) ABSTRACT

A data processing system includes technology to detect a memory attack. The data processing system comprises a processing core, a memory controller, a memory bus, and memory. The memory controller comprises a memory attack detection module (MADM). The MADM comprises first and second input units and control logic in communication with the first and second input units. The control logic is configured to determine, based on first and second signals from the first and second input units, respectively, whether the memory bus is carrying a clock enable (CKE) signal of high (H), even though the memory controller is generating the CKE signal of low (L). The control logic is also configured to generate a physical memory attack detection indicator that indicates whether the memory bus is carrying the CKE signal of H, even though the memory controller is generating the CKE signal of L. Other embodiments are described and claimed.

20 Claims, 4 Drawing Sheets

(56) References Cited

OTHER PUBLICATIONS

"How to Build a Voltage Sensor Circuit", LearningaboutElectronics, accessed Feb. 10, 2018, 8 pages, http://www.learningaboutelectronics.com/Articles/Voltage-sensor-circuit.php.

Wikipedia, "Flip-flop (electronics)", accessed Feb. 10, 2018, 17 pages, https://en.wikipedia.org/wiki/Flip-flop_(electronics).

Wikipedia, "Synchronous dynamic random-access memory", accessed Feb. 10, 2018, 16 pages, https://en.wikipedia.org/wiki/Synchronous_dynamic_random-access_memory.

Wikipedia, "DDR SDRAM", accessed Feb. 10, 2018, 7 pages, https://en.wikipedia.org/wiki/DDR_SDRAM.

Wikipedia, "DDR4 SDRAM", accessed Feb. 10, 2018, 13 pages, https://en.wikipedia.org/wiki/DDR4_SDRAM.

Wikipedia, "Low Pin Count", accessed Feb. 10, 2018, 8 pages https://en.wikipedia.org/wiki/Low_Pin_Count.

Wikipedia, "Intel QuickPath Interconnect", accessed Feb. 10, 2018, 6 pages, https://en.wikipedia.org/wiki/Intel_QuickPath_Interconnect.

Wikipedia, "Root complex", accessed Feb. 12, 2018, 1 page, https://en.wikipedia.org/wiki/Root_complex.

Trikalinou, et al., "Taking DMA Attacks to the Next Level: How to do Arbitrary Memory Reads/Writes in a Live and Unmodified System Using a Rogue Memory Controller", accessed Feb. 23, 2018, 2 pages, https://www.blackhat.com/us-17/briefings/schedule/#taking-dma-attacks-to-the-next-level-how-to-do-arbitrary-memory-readswrites-in-a-live-and-unmodified-system-using-a-rogue-memory-controller-7731.

Trikalinou, et al., "Taking DMA Attacks to the Next Level", Jul. 22-27, 2017, 43 pages, https://www.blackhat.corn/docs/us-17/wednesday/us-17-Trikalinou-Taking-DMA-Attacks-To-The-Next-Level-How-To-Do-Arbitrary-Memory-Reads-Writes-In-A-Live-And-Unmodified-System-Using-A-Rogue-Memory-Controller.pdf.

SK Hynix Inc., "DDR4 SDRAM Device Operation", 261 pages, accessed Feb. 24, 2018, https://www.skhynix.com/static/filedata/fileDownload.do?seq=253.

* cited by examiner

SYSTEMS, METHODS, AND APPARATUS FOR COMBATTING DIRECT MEMORY ACCESS ATTACKS

TECHNICAL FIELD

The present disclosure pertains in general to data processing systems and in particular to systems, methods, and apparatus for combatting direct memory access attacks.

BACKGROUND

In one embodiment, a data processing system includes at least one processing core, memory, a memory controller, and a memory bus. The memory bus enables the memory controller to communicate with the memory, and the processing core accesses the memory via the memory controller and the memory bus. The data processing system may also allow some subsystems of the data processing system to access the memory without using the processing core. In other words, the data processing system may support direct memory access (DMA). For instance, the data processing system may include an input-output memory management unit (IOMMU) that enables devices other than the processing core to access the memory.

One way for an attacker to attack such a data processing system is for the attacker to execute malware on the processing core. Such malware may enable the attacker to obtain unauthorized access to the memory.

Alternatively, an attacker may be able to obtain unauthorized access to the memory without using the processing core. For purposes of this disclosure, an attack which attempts to obtain unauthorized access to memory in a data processing system without using the data processing system's processing core may be referred to as a DMA attack.

The present disclosure describes systems, methods, and apparatus for combatting DMA attacks.

BRIEF DESCRIPTION OF THE DRAWINGS

Features and advantages of the present invention will become apparent from the appended claims, the following detailed description of one or more example embodiments, and the corresponding figures, in which:

DETAILED DESCRIPTION

As indicated above, a data processing system may include components such as a processing core, memory, a memory controller, and a memory bus. The processing core may be implemented as an integrated circuit in a chip in a processor package. The memory controller may also be integrated into that processor package, or the memory controller may reside on a separate package. The memory may consist of one or more memory modules containing volatile random access memory (RAM). The memory bus couples the memory controller to the memory. The memory bus may be implemented as a collection of electrically or optically conductive lines on or in a substrate (e.g., printed circuit board). For purposes of this disclosure, a substrate with a memory bus that enables a memory controller to communicate with memory may be referred to in general as a motherboard.

As also indicated above, in a DMA attack, an attacker attempts to obtain unauthorized access to memory in a data processing system without using the data processing system's processing core. A DMA attack may also be referred to as physical side-channel attack. An attacker may use such an attack to compromise a system or device, for instance by extracting valuable information that is stored in the memory (e.g., encryption keys, passwords, etc.) or by corrupting the memory to bypass its security measures (e.g., by modifying page tables, modifying kernel code to introduce malware, etc.).

Some types of DMA attacks use high-speed expansion ports that permit direct memory access. Another type of DMA attack does not use a high-speed expansion port. Instead, the attacker connects directly to the memory bus. For instance, the motherboard may include exposed pins that are coupled to the lines in the memory bus, and the attack device may connect to those pins. After connecting to those pins, the attack device may issue read and write commands to the memory. For purposes of this disclosure, the term "physical memory attack" refers to a type of DMA attack in which the attack device does not use the processing core or any high-speed expansion ports to access the memory, but the attack device instead connects directly to the memory bus. In a physical memory attack, the attack device does not use the target system's processing core or the target system's IOMMU to perform reads or writes against the memory.

The present disclosure introduces a memory attack detection module that can detect physical memory attacks. The present disclosure also introduces additional features for combatting such attacks.

Figure 1:
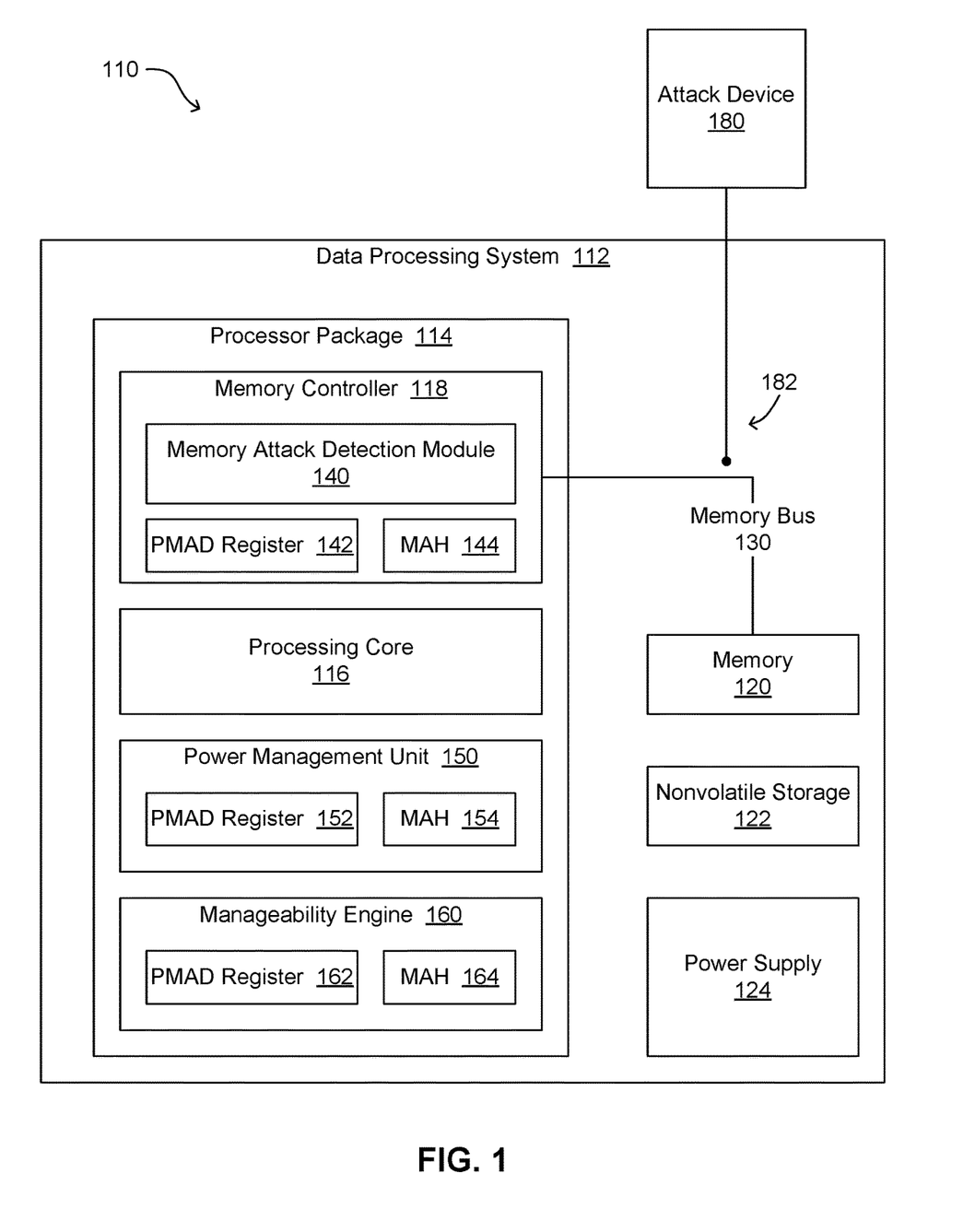
FIG. 1 is a block diagram of an example embodiment of a data processing environment which includes a data processing system with technology for detecting physical memory attacks.

FIG. 1 is a block diagram of an example embodiment of a data processing environment 110 which includes a data processing system 112 with technology for combatting physical memory attacks. In the embodiment of FIG. 1, data processing system 112 includes memory 120 and a processor package 114 with a processing core 116 and a memory controller 118. Data processing system 112 also includes a memory bus 130 in communication with processor package 114 and memory 120. Memory bus 130 enables processing core 116 to communicate with memory 120 via memory controller 118. In one embodiment, memory bus 130 is part of a peripheral component interconnect express (PCI-E) root complex. Other types of memory buses may be used in other embodiments.

Data processing system 112 may use memory 120 to store information for immediate use by processing core 116 or by other components. Accordingly, memory 120 may be referred to as main memory or as primary storage. In one embodiment, memory 120 is volatile RAM that consists of one or more memory modules, each of which plug into a slot in a memory socket. A memory module may be implemented, for instance, as a dual inline memory module (DIMM) that uses synchronous dynamic RAM (SDRAM) with a double data rate (DDR) interface or protocol. Such memory may be referred to as socketed DDR SDRAM. One protocol for such memory has been established by the JEDEC standards body under the name "DDR4." However, other types of memory modules or memory packages with other types of RAM and other types of interfaces that follow other types of standards may be used in other embodiments.

In one embodiment, a memory module may plug into a memory socket on the motherboard, and that socket may include numerous pins, bumps, or other conductors that are connected to the different lines on the memory bus. The memory bus may also be exposed in one or more other areas of the system. For instance, the memory socket may reside on one side of the motherboard, and through-hole pins from the memory socket may pass through the motherboard and protrude from the other side. Consequently, the memory bus may be exposed via those through-hole pins. For purposes of this disclosure, any exposed pins, bumps, or other conductors on a motherboard that connect to a memory bus in that motherboard may be referred to in general as memory pins or raw memory pins.

FIG. 1 also depicts an attack device 180 in data processing environment 110. In particular, attack device 180 is illustrated outside of data processing system 112, but with a probe 182 that is inside data processing system 112, almost connected to a memory bus 130 in data processing system 110. Thus, FIG. 1 illustrates that an attacker is about to connect probe 182 to memory bus 130 in an attempt to access memory in data processing system 112. For instance, the attacker could connect probe 182 directly to memory pins in data processing system 112 and then attempt to read and/or corrupt the system memory without the system's knowledge or consent. For instance, the attacker may send read and/or write signals to memory bus 130.

However, in the embodiment of FIG. 1, memory controller 118 includes a memory attack detection module (MADM) 140 which is able to detect signals from an attacker on memory bus 130. A MADM may also be referred to as a memory attack detection circuit or a memory attack detection device. MADM 140 detects physical DMA attacks by detecting external manipulations of the signals on memory bus 130. Consequently, MADM 140 can detect if an attacker attempts to drive communication towards memory 120 without the system's consent.

In particular, MADM 140 detects whether at least one line on memory bus 130 is not carrying the value that memory controller 20 is generating for that line. In other words, MADM 140 detects whether at least one signal on memory bus 130 is not what it should be. For purposes of this disclosure, a signal on a line of memory bus that does not match what the memory controller is generating for that line may be referred to as a rogue signal.

Figure 3:
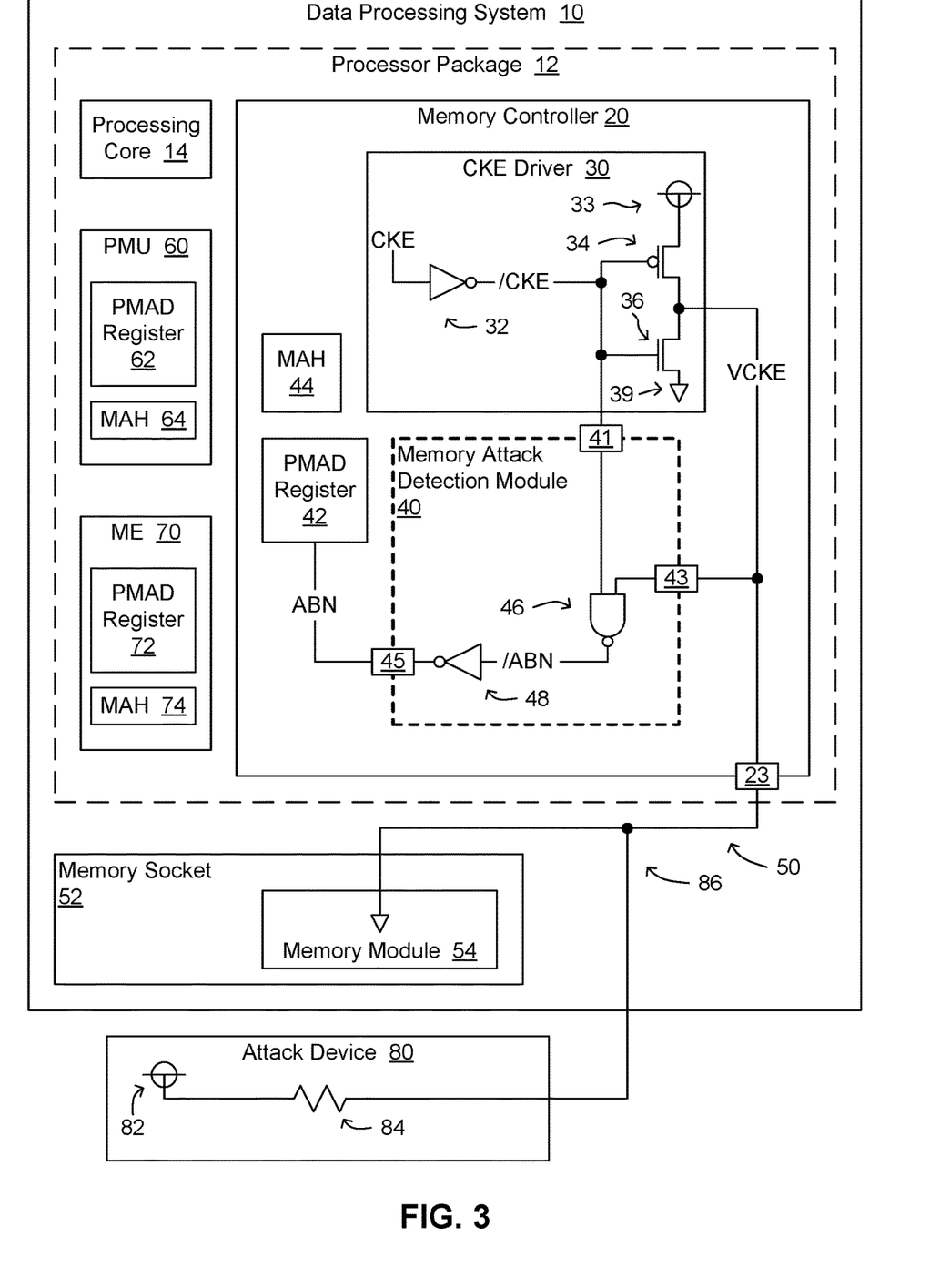
FIG. 3 is a block diagram of a data processing system with a memory controller that includes an example embodiment of a memory attack detection module.
Figure 4:
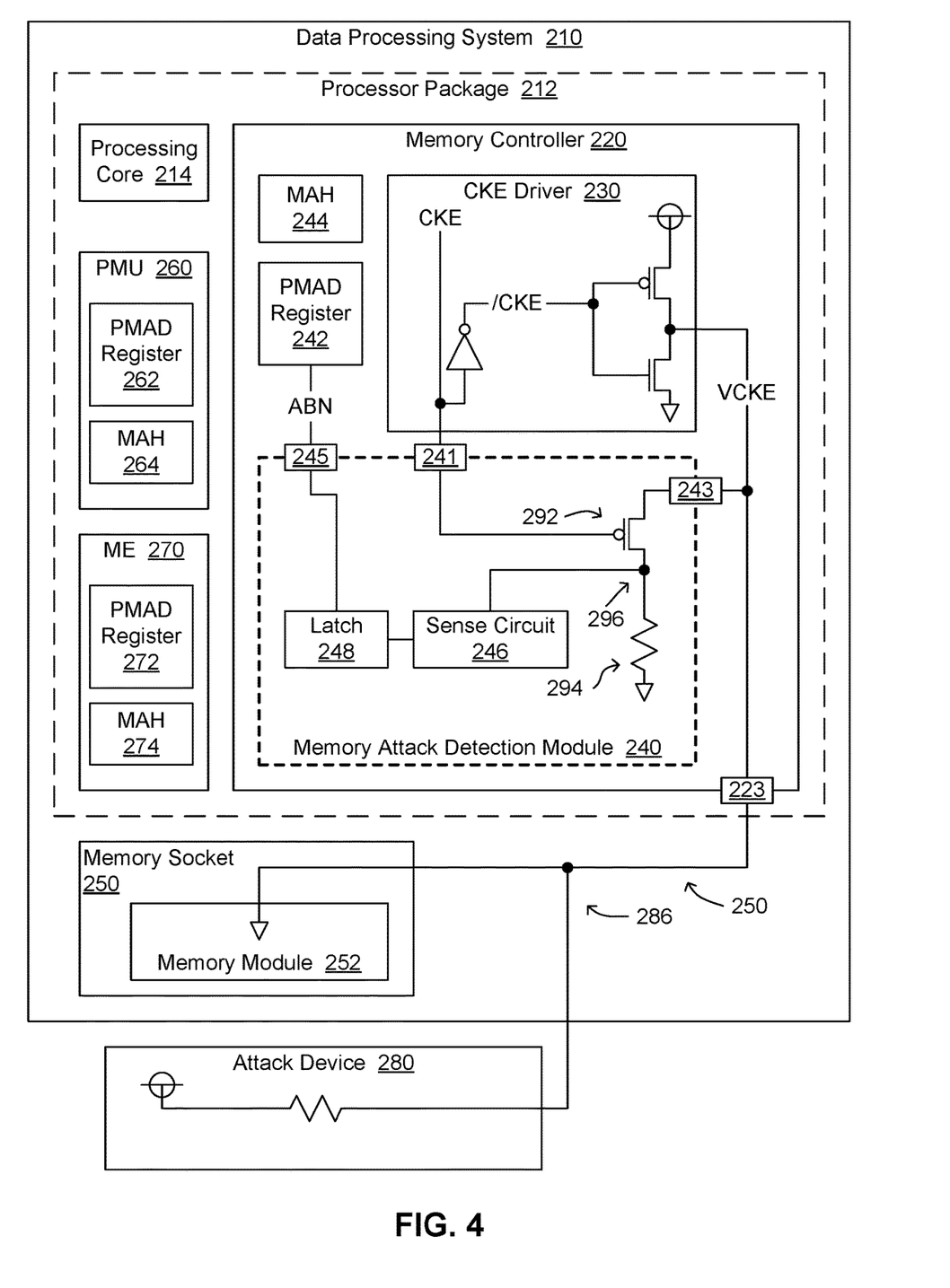
FIG. 4 is a block diagram of a data processing system with a memory controller that includes another example embodiment of a memory attack detection module.

Accordingly, MADM 140 detects attacks by detecting rogue signals on memory bus 130. In addition, MADM 140 automatically responds to rogue signals, to combat such attacks. For instance, MADM 140 may generate output which indicates that a physical memory attack has been detected. Such output may be referred to as a physical memory attack detection (PMAD) indicator. PMAD indicators may be implemented in any suitable fashion in different embodiments. For instance, MADM 140 may send the PMAD indicator to other components, within memory controller 118 or outside of memory controller 118, as a signal, using any suitable protocol. As illustrated in FIGS. 3 and 4, such a signal may be referred to as an abnormal (ABN) signal. In addition or alternatively, MADM 140 may set one or more registers, within memory controller 118 or outside of memory controller 118, with a value that serves as a PMAD indicator. In other words, that value indicates that a rogue signal has been detected. The registers which receive PMAD indicators may be referred to as PMAD registers. MADM 140 may thus notify other components of data processing system 112 that a physical memory attack has been detected.

For example, in the embodiment of FIG. 1, data processing system 112 includes a power management unit (PMU) 150 and a manageability engine (ME) 160. Also, memory controller 118 includes a PMAD register 142, PMU 150 includes a PMAD register 152, and PMU 150 includes a PMAD register 162. MADM 140 automatically sets PMAD registers 142, 152, and 162 in response to detecting a rogue signal on memory bus 130. As described in greater detail below, data processing system 112 may then respond to one or more PMAD indicators by automatically taking remedial action.

Figure 2:
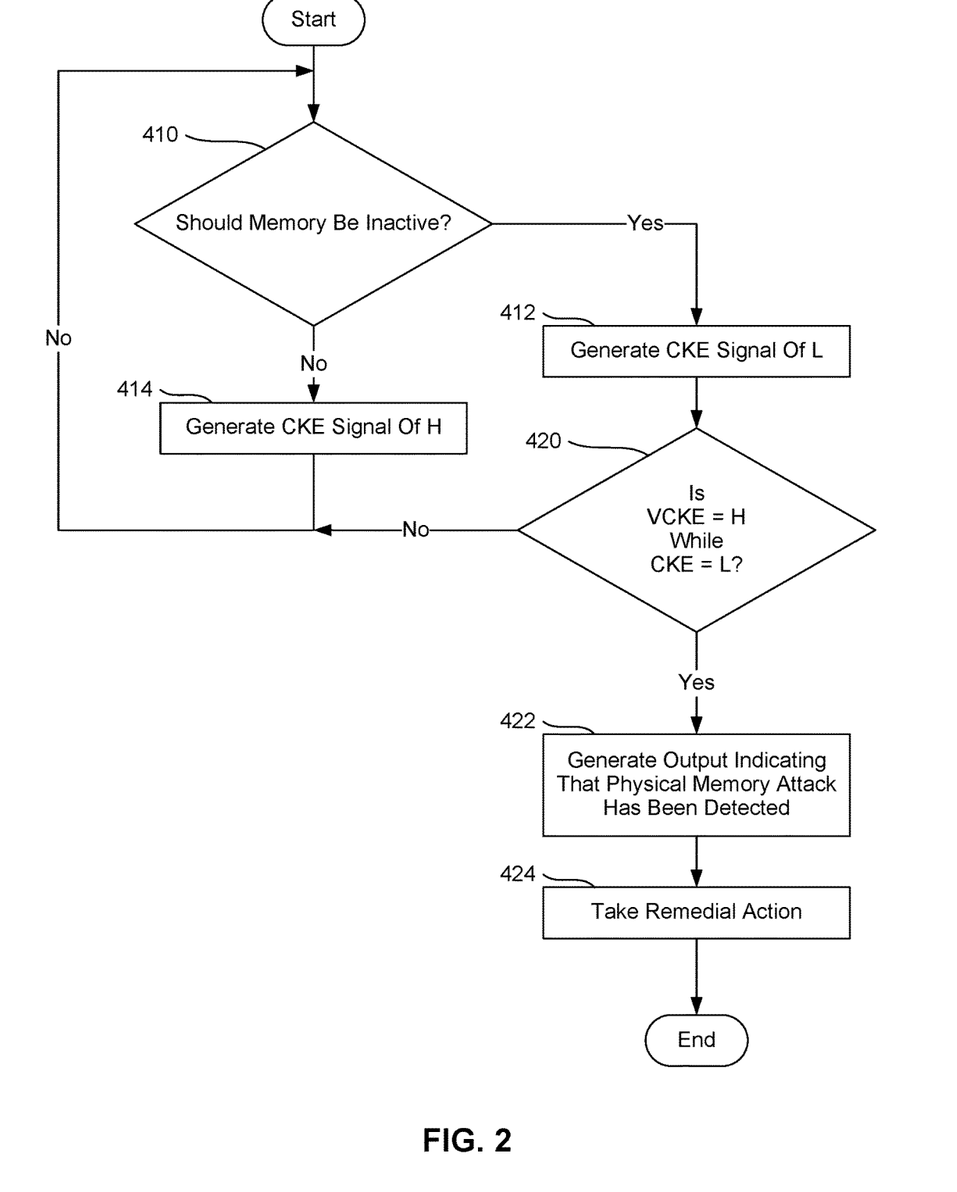
FIG. 2 presents a flowchart of an example embodiment of a process for detecting and combatting physical memory attacks.

FIG. 2 presents a flowchart of an example embodiment of a process for detecting and combatting physical memory attacks. The process of FIG. 2 is designed to detect attacks that are carried out when memory 120 is supposed to be in an inactive state. For instance, data processing system 112 may follow a power management protocol such as the Advanced Configuration and Power Interface (ACPI), which provides different power states, such as the state of "sleeping" or "G1", and the states of "S1" through "S4," which are different states within the state of G1. The S3 state, for example, is a sleeping state in which RAM should remain powered, so the contents of RAM are not lost. Thus, when data processing system 112 is in the S3 state, memory 120 should be inactive, but it should remain powered on. In other embodiments, data processing systems may use other protocols for inactive or sleep states.

The process of FIG. 2 is designed to detect attacks that are carried out while data processing system 112 is in the S3 sleep state. When data processing system 122 is in the S3 state, no reads or writes should be carried out in memory bus 130. However, when data processing system 122 is in the S3 state, an attacker may inject signals into memory bus 130 through exposed pins to become the sole master of the bus. Consequently, the attacker may issue read and/or write commands to memory 120 without the need to get in synchronization with any ongoing memory traffic on memory bus 130.

The process of FIG. 2 starts with data processing system 112 executing normally. As shown at block 410, memory controller 118 may then determine whether memory 120 should be in an inactive state. For instance, memory controller 118 may determine that data processing system 112 should be in the S3 state. If memory 120 should be in an inactive state, memory controller 118 may generate a signal on memory bus 130 to send memory 120 into the inactive state. For instance, in the embodiment of FIG. 1, memory bus 130 includes a clock enable (CKE) line that is set to a value of high (H) to indicate that memory 120 should be active and that is set to a value of low (L) to indicate that memory 120 should be inactive. Accordingly, as shown at blocks 412 and 414 of FIG. 2, memory controller 118 sets CKE to H when memory 120 should be active, and memory controller 118 sets CKE to L when memory 120 should be inactive. Additional details on how a memory controller may generate signals for a memory bus and detect rogue signals on the memory bus are provided in FIGS. 3 and 4, with regard to two different example embodiments. However, other embodiments may use other techniques to generate signals for a memory bus and to detect rogue signals on the memory bus.

FIG. 3 is a block diagram of a data processing system 10 with a memory controller 20 that includes an example embodiment of a MADM 40. Data processing system 10 in FIG. 3 may be the same as or similar to data processing system 112 in FIG. 1. Thus, like data processing system 112 in FIG. 1, data processing system 10 in FIG. 3 includes a processor package 12 that include a processing core 14, a PMU 60 with a PMAD register 62, an ME 70 with a PMAD register 72, and a memory controller 20 with a PMAD register 42. PMAD register 42 may be implemented as a local memory-mapped input/output (MMIO) register, for instance. Data processing system 10 also includes memory and a memory bus 50 to couple the memory to memory controller 20. In FIG. 3, the memory is shown as a memory module 54 in a memory socket 52. FIG. 3 also shows an attack device 80 with a probe 86 coupled to memory bus 50.

FIG. 3 also illustrates additional details for an example embodiment of memory controller 20, including details for a CKE driver 30 and MADM 40 within memory controller 20. However, as will be evident to one of skill in the art, for ease of understanding, at least some of the features of the memory controllers in FIGS. 3 and 4 are shown in simplified form, and FIGS. 3 and 4 do not show many other features of the memory controllers. And in other embodiments, the illustrated features may be modified to accomplish the same ends in different ways.

In the embodiment of FIG. 3, memory controller 20 uses CKE driver 30 to generate the desired signal for CKE on memory bus 50. As shown in FIGS. 3 and 4, for purposes of this disclosure, the value that the memory controller is trying to send for CKE on the memory bus may be referred to (and illustrated with the memory controller) as CKE. However, the value that the memory bus is actually carrying for CKE may be referred to as VCKE. Thus, when an attacker sends a rogue CKE signal on the memory bus, CKE and VCKE may not match. For instance, an attacker may drive VCKE high while the memory controller is trying to send a CKE signal of low.

In the embodiment of FIG. 3, attack device 80 is connected to memory bus 50 between memory module 54 and memory controller 20. On a hardware level, attack device 80 may inject voltage that memory module 54 interprets as logic high or logic low. For instance, for DDR4, a voltage level from 0.7 volts to 1.2 volts is interpreted as H and a voltage level from 0 volts to 0.5 volts is interpreted as L. In one embodiment, memory module 54 is configured to enter or remain in inactive states such as self-refresh or power-down in response to receiving CKE of L. A CKE of L may trigger other types of inactive states in other embodiments.

FIG. 3 provides a simplified circuit representation of memory bus 50 when attack device 80 connects to it and injects an attack voltage (VA) onto the CKE line. The CKE line is important because it controls the state of the memory, as it is used to put the memory into a low power mode/suspend/inactive mode (with CKE=L) or into a high power/active mode (with CKE=H). When data processing system 10 is in S3 sleep, memory controller 20 is driving the CKE line to 0 volts to put the memory into (or keep the memory in) an inactive, low power, self-refresh state. That state prohibits memory accesses. Consequently, attack device 80 first needs to inject VA in order to pull CKE to logic high to begin issuing read and writes to the victim memory. Accordingly, attack device 80 is illustrated with a power source 82 and a working resistance 84. Consequently, the current that flows through working resistance 84 and probe 86 into the CKE line of memory bus 50 constitutes the CKE attack voltage.

At the same time, memory controller 20 will be generating a CKE signal of L or H, as indicated above with regard to blocks 412 and 414 of FIG. 2. For instance, memory controller 20 may send an internal CKE signal to CKE driver 30, to cause CKE driver 30 to generate a corresponding signal for memory bus 50. Memory controller 20 may determine whether CKE should be low or high based on a power management protocol, memory activity, and/or any other suitable factors. For instance, memory controller 20 may determine that CKE should be low and memory should be put to sleep to save power, based on an internal timer which indicates that memory has been idle (i.e., has not been accesses) for some time. Alternatively, memory controller 20 may determine that CKE should be low based on one or more commands from PMU 60 to put the memory to sleep. PMU 60 may send such commands for a variety of reasons (e.g., in response to a user request to put data processing system 10 to sleep, in response to a power management idle timer, etc.).

FIG. 3 presents a simplified circuit diagram showing that CKE driver 30 drives or influences VCKE on memory bus 50 based on the internal CKE signal. For instance, in FIG. 3, CKE driver 30 includes an inverter 32 that inverts the internal CKE signal into/CKE. CKE driver 30 then uses/CKE to generate the CKE signal for memory bus 50. For instance, as shown, CKE driver 30 may use a power source 33, a P-type metal-oxide-semiconductor (PMOS) transistor 34, an N-type metal-oxide-semiconductor (NMOS) transistor 36, and a ground 39 to generate the CKE signal for memory bus 50. That CKE signal may pass through an output pin 23 of processor package 12 onto memory bus 50.

Referring again to FIG. 2, memory controller 20 may then determine whether there is a rogue signal on memory bus 50. For instance, MADM 40 in memory controller 20 may determine whether VCKE is high while memory controller 20 is trying to drive VCKE low.

As illustrated in FIG. 3, MADM 40 includes a first input line 41 which indicates whether memory controller 20 is trying to drive VCKE high or low (i.e., whether VCKE is supposed to be high or low), as well as a second input line 43 which indicates whether VCKE is actually high or low. Additionally, MADM 40 includes control logic which generates output that indicates whether VCKE is actually high while it is supposed to be low. For instance, in the embodiment of FIG. 3, MADM 40 uses a NAND gate 46 which generates a negative result (depicted as "/ABN") if /CKE and VCKE are both high, and which generates a positive result otherwise. MADM 40 also uses an inverter 48 to invert /ABN to ABN. Thus, MADM 40 uses a feedback loop from VCKE and NAND logic to detect a rogue CKE signal on memory bus 50.

The following characteristic table summarizes the values of CKE, /CKE, VCKE, /ABN, and ABN, in the context of data processing system 10.

| CKE | /CKE | VCKE | /ABN | ABN |
|---|---|---|---|---|
| 0 | 1 | 0 | 1 | 0 |
| 0 | 1 | 1 | 0 | 1 |
| 1 | 0 | 0 | 1 | 0 |
| 1 | 0 | 1 | 1 | 0 |

As shown in the first row of values, for the inactive state (CKE=0 or L), the input signal of CKE driver 30 (/CKE) is set to 1 or H. And if VCKE is actually 0, /ABN is set to 1 and ABN is set to 0. However, as shown in the second row, if /CKE and VCKE are both 1, /ABN is set to 0 and ABN is set to 1, indicating an abnormal condition (i.e., a rogue signal). In other words, the second row reflects that memory controller 20 is trying to set VCKE to L for an inactive state, but attack device 80 is forcing VCKE to H. Thus, if the VCKE voltage is pulled-up by attack device 80, the feedback path sends the voltage change to the NAND gate 46, and MADM 40 asserts ABN, the abnormal detection signal. A rogue CKE signal on memory bus 50 may be referred to as an abnormal event on the CKE signal node.

As shown at block 422 of FIG. 2, MADM 40 may then generate output which indicates whether VCKE is actually high when it is supposed to be low. For instance, in the embodiment of FIG. 3, MADM 40 sends the ABN signal as output on an output line 45. That ABN signal may be considered a PMAD indicator. In addition or alternatively, a MADM may use other types of output mechanisms or facilities to output the PMAD indicator. For instance, MADM 40 may any suitable output facility to set PMAD register 42 with a value to indicate whether VCKE is actually high while it is supposed to be low. That value may also be considered a PMAD indicator. In addition or alternatively, memory controller 20 may set PMAD registers 62 and 72 with a value to indicate whether VCKE is actually high while it is supposed to be low. Those values may also be considered PMAD indicators. In addition or alternatively, memory controller 20 may send a PMAD indicator to processing core 14 and/or to any other suitable components of data processing system 10.

For purposes of this disclosure, the term "input unit" denotes a conductor, a collection of related conductors, or any other mechanism or facility that enables a unit to receive input. Similarly, the term "output unit" denotes a conductor, a collection of related conductors, or any other mechanism or facility that enables a unit to send output. Accordingly, input lines 41 and 43 may be referred to as input units, and output line 45 may be referred to as an output unit.

In an embodiment that uses a PCI-E root complex, the memory controller may use a standard PCI-E protocol to send PMAD indicators to other components. For instance, the memory controller may use a standard PCI-E protocol to set MMIO registers in an ME and/or in a PMU, as indicated above. In one embodiment, the ME and the PMU remain awake or active when the data processing system is in the S3 sleep state. In addition, the ME is configured to automatically generate an interrupt in response to its PMAD register being set, as is the PMU. Such an interrupt may be referred to as a PMAD interrupt. In addition, the ME is configured to automatically trigger remedial action in response to the PMAD interrupt, as is the PMU. For instance, the ME and/or the PMU may cause the data processing system to reboot in response to the PMAD interrupt. Remedial actions are described in greater detail below.

Referring again to FIG. 2, data processing system 10 may automatically take remedial action in response to a PMAD indicator which indicates that a rogue signal has been detected, as shown at block 424. In other words, data processing system 10 may take remedial action in response to a positive PMAD indicator (such as a positive ABN signal and/or a positive value in PMAD register 42). Any suitable type of remedial action may be taken in different embodiments and scenarios.

For instance, the memory controller or some other component in the data processing system may be configured to automatically check a PMAD register whenever the data processing system is waking up from sleep, before the memory controller initiates any memory accesses. And if the PMAD register is set to 1 (meaning an attack happened), the memory controller (or other component) may cause the data processing system to reboot by sending a reset signal to the PMU or the ME. In addition or alternatively, the memory controller may be configured to automatically respond to a positive PMAD indicator by waking up the data processing system (e.g., by sending a wake signal to the PMU or the ME). Alternatively, the memory controller may be configured to automatically respond to a positive PMAD indicator by shutting off power to the whole system, including the memory, in order to discharge the memory and erase its contents. The memory controller may shut off power by sending a power-down signal to the PMU, for instance. In addition or alternatively, a positive PMAD indicator may automatically trigger an emergent task that performs one or more of the above remedial actions or others. For instance, the emergent task may be performed by a PMAD interrupt handler that executes on the processor core, the ME, or the memory controller, and that interrupt handler may wake up the data processing system in order to disturb the attack.

In addition or alternatively, the PMAD interrupt handler may send an attack detection notice to the owner of the data processing system and/or to one or more other entities outside of the data processing system. Such an attack detection notice may also be referred to as a PMAD notice. For instance, in one embodiment, the sending of a PMAD notice may involve the PMU sending a wake signal to the processing core. Then, when the processing core wakes up, the processing core may automatically execute a PMAD interrupt handler in response to a positive PMAD indicator. That PMAD interrupt handler may notify the operating system (OS) that a memory attack has been detected, for instance by generating a machine-check exception. The machine-check exception handler in the OS may then respond by displaying an error message which notifies the owner of the system that a memory attack has been detected.

For purposes of this disclosure, the control logic for automatically determining whether a positive PMAD indicator has been generated and for automatically responding to a positive PMAD indicator by taking remedial action may be referred to in general as a memory attack handler (MAH). Accordingly, as shown in FIG. 1, memory controller 118 may include an MAH 144, PMU 150 may include an MAH 154, and ME 160 may include an MAH 164. Similarly, in the embodiment of FIG. 3, memory controller 20 may include an MAH 44, PMU 60 may include an MAH 64, and ME 70 may include an MAH 74. And in the embodiment of FIG. 4, memory controller 220 may include an MAH 244, PMU 260 may include an MAH 264, and ME 270 may include an MAH 274.

The data processing system may use the above techniques or others to respond to the abnormal voltage situation at the CKE signal in the memory bus, to prevent the attack and protect the privacy of the data in the memory.

FIG. 4 is a block diagram of a data processing system 210 with a memory controller 220 that includes another example embodiment of a MADM 240. Data processing system 210 in FIG. 4 may be the same as or similar to data processing system 112 in FIG. 1. Thus, data processing system 210 includes a processor package 212 with a processing core 214, a PMU 260 with a PMAD register 262, an ME 270 with a PMAD register 272, and a memory controller 220 with a PMAD register 242. Memory controller 220 also includes a CKE driver 230. Memory controller 220 uses CKE driver 230 to generate the desired signal for CKE on memory bus 250. Data processing system 210 also includes memory and a memory bus 250 to couple the memory to memory controller 220. In FIG. 4, the memory is shown as a memory module 254 in a memory socket 252. FIG. 4 also shows an attack device 280 with a probe 286 coupled to memory bus 250.

In the embodiment of FIG. 4, instead of a NAND gate, MADM 240 uses a PMOS transistor 292 and a resistor 294 to detect rogue signals. When the memory is supposed to be inactive, MADM 240 will be receiving a CKE signal of L via input line 241. In addition, MADM 240 monitors the actual VCKE on memory bus 250 via input line 243. Specifically, the voltage level of VCKE passes through pin 223 of processor package 212 and input line 243 of MADM 240 to reach PMOS transistor 292 as the source. In addition, PMOS transistor 292 is gated by the internal CKE value from CKE driver 230, and a voltage detection ($V_{DET}$) node 296 is connected to the drain. Consequently, if CKE is high, PMOS transistor 292 will prevent VCKE from reaching $V_{DET}$ node 296, and $V_{DET}$ node 296 will therefore remain low. The voltage at $V_{DET}$ node 296 will also be low if CKE is low and VCKE is low. However, if attack device 280 then pulls VCKE up to H while CKE is low, that high signal will pass through PMOS transistor 292 to reach $V_{DET}$ node 296. A sense circuit 246 in MADM 240 monitors $V_{DET}$ node 296 for a high signal. When sense circuit 246 detects a high signal at $V_{DET}$ node 296, sense circuit 246 sets a latch 248 with a value to indicate that a rogue signal has been detected. In other words, sense circuit 246 sets latch 248 with a PMAD indicator. MADM 240 may also transmit that PMAD indicator to other components. For instance, MADM 240 may use an output line 245, or some other output mechanism, to update PMAD register 242. In addition or alternatively, memory controller 220 may use any suitable output mechanism to update PMAD registers 262 and 272. In addition or alternatively, memory controller 220 may send a PMAD indicator to processing core 214 and/or to any other suitable components of data processing system 210. Data processing system 210 may then automatically take any suitable remedial actions, as indicated above.

Thus, a data processing system according to the present disclosure includes a detection and protection mechanism that has the ability to detect physical memory attacks. In addition, when such as attack is detected, the system may automatically take remedial action, such as informing the owner of the system, return the system to a safe state, etc.

Although certain example embodiments are described herein, one of ordinary skill in the art will understand that those example embodiments may easily be divided, combined, or otherwise altered to implement additional embodiments. Likewise, expressions such as "an embodiment," "one embodiment," and "another embodiment" are meant to generally reference embodiment possibilities. Those expressions are not intended to limit the invention to particular embodiment configurations. As used herein, those expressions may reference the same embodiment or different embodiments, and those embodiments are combinable into other embodiments. In light of the principles and example embodiments described and illustrated herein, it will be recognized that the illustrated embodiments can be modified in arrangement and detail without departing from such principles.

As described above, a device may include instructions and other data which, when accessed by a processor, cause the device to perform particular operations. For purposes of this disclosure, instructions which cause a device to perform operations may be referred to in general as software. Software and the like may also be referred to as control logic. Software that is used during a boot process may be referred to as firmware, as may software that is stored in nonvolatile memory. Software may be organized using any suitable structure or combination of structures. Accordingly, terms like program and module may be used in general to cover a broad range of software constructs, including without limitation application programs, subprograms, routines, functions, procedures, drivers, libraries, data structures, processes, microcode, and other types of software components. Also, it should be understood that a software module may include more than one component, and those components may cooperate to complete the operations of the module. Also, the operations which the software causes a device to perform may include creating an operating context, instantiating a particular data structure, etc. Any suitable operating environment and programming language (or combination of operating environments and programming languages) may be used to implement software components described herein.

A medium which contains data and which allows another component to obtain that data may be referred to as a machine-accessible medium or a machine-readable medium. In one embodiment, software for multiple components is stored in one machine-readable medium. In other embodiments, two or more machine-readable media may be used to store the software for one or more components. For instance, instructions for one component may be stored in one medium, and instructions another component may be stored in another medium. Or a portion of the instructions for one component may be stored in one medium, and the rest of the instructions for that component (as well instructions for other components), may be stored in one or more other media. Similarly, software that is described above as residing on a particular device in one embodiment may, in other embodiments, reside on one or more other devices. For instance, in a distributed environment, some software may be stored locally, and some may be stored remotely. Similarly, operations that are described above as being performed on one particular device in one embodiment may, in other embodiments, be performed by one or more other devices.

Accordingly, alternative embodiments include machine-readable media containing instructions for performing the operations described herein. Such media may be referred to in general as apparatus and in particular as program products. Such media may include, without limitation, tangible non-transitory storage components such as magnetic disks, optical disks, RAM, read-only memory (ROM), etc., as well as processors, controllers, and other components that include data storage facilities. For purposes of this disclosure, the term "ROM" may be used in general to refer to nonvolatile memory devices such as erasable programmable ROM (EPROM), electrically erasable programmable ROM (EEPROM), flash ROM, flash memory, etc.

It should also be understood that the hardware and software components depicted herein represent functional elements that are reasonably self-contained so that each can be designed, constructed, or updated substantially independently of the others. In alternative embodiments, many of the components may be implemented as hardware, software, or combinations of hardware and software for providing the functionality described and illustrated herein. In some embodiments, some or all of the control logic for implementing the described operations may be implemented in hardware logic (e.g., as part of an integrated circuit chip, a programmable gate array (PGA), an application-specific integrated circuit (ASIC), etc.).

For example, each MADM and each MAH may be implemented using one or more hardware components, one or more software components, or any suitable combination of hardware and software components.

Additionally, the present teachings may be used to advantage in many different kinds of data processing systems. Such data processing systems may include, without limitation, accelerators, systems on a chip (SOCs), wearable devices, handheld devices, smartphones, telephones, entertainment devices such as audio devices, video devices, audio/video devices (e.g., televisions and set-top boxes), vehicular processing systems, personal digital assistants (PDAs), tablet computers, laptop computers, portable computers, personal computers (PCs), workstations, servers, client-server systems, distributed computing systems, supercomputers, high-performance computing systems, computing clusters, mainframe computers, mini-computers, and other devices for processing or transmitting information. Accordingly, unless explicitly specified otherwise or required by the context, references to any particular type of data processing system (e.g., a PC) should be understood as encompassing other types of data processing systems, as well. A data processing system may also be referred to as an apparatus. The components of a data processing system may also be referred to as apparatus.

Also, unless expressly specified otherwise, components that are described as being coupled to each other, in communication with each other, responsive to each other, or the like need not be in continuous communication with each other and need not be directly coupled to each other. Likewise, when one component is described as receiving data from or sending data to another component, that data may be sent or received through one or more intermediate components, unless expressly specified otherwise. In addition, some components of the data processing system may be implemented as adapter cards with interfaces (e.g., a connector) for communicating with a bus. Alternatively, devices or components may be implemented as embedded controllers, using components such as programmable or non-programmable logic devices or arrays, ASICs, embedded computers, smart cards, and the like. For purposes of this disclosure, the term "bus" includes pathways that may be shared by more than two devices, as well as point-to-point pathways. Similarly, terms such as "line," "pin," etc. should be understood as referring to a wire, a set of wires, or any other suitable conductor or set of conductors. For instance, a bus may include one or more serial links, a serial link may include one or more lanes, a lane may be composed of one or more differential signaling pairs, and the changing characteristics of the electricity that those conductors are carrying may be referred to as signals on a line. Also, for purpose of this disclosure, the term "processor" denotes a hardware component that is capable of executing software. For instance, a processor may be implemented as a central processing unit (CPU), a processing core, or as any other suitable type of processing element. A CPU may include one or more processing cores, and a device may include one or more CPUs.

Also, although one or more example processes have been described with regard to particular operations performed in a particular sequence, numerous modifications could be applied to those processes to derive numerous alternative embodiments of the present invention. For example, alternative embodiments may include processes that use fewer than all of the disclosed operations, process that use additional operations, and processes in which the individual operations disclosed herein are combined, subdivided, rearranged, or otherwise altered.

In view of the wide variety of useful permutations that may be readily derived from the example embodiments described herein, this detailed description is intended to be illustrative only, and should not be taken as limiting the scope of coverage.

What is claimed is:

1. A semiconductor package with technology to detect a memory attack, the semiconductor package comprising:
    an integrated circuit comprising a memory attack detection module (MADM), wherein the MADM comprises:
    a first input unit;
    a second input unit; and
    control logic in communication with the first input unit and the second input unit, wherein the control logic is configured to:
        determine, based on a first signal from the first input unit and a second signal from the second input unit, whether a memory bus in a data processing system is carrying a clock enable (CKE) signal of high (H), even though a memory controller in the data processing system is generating the CKE signal of low (L); and
        generate a physical memory attack detection (PMAD) indicator, wherein the PMAD indicator indicates whether the memory bus is carrying the CKE signal of H, even though the memory controller is generating the CKE signal of L.

2. A data processing system comprising:
    a semiconductor package according to claim 1;
    a memory bus according to claim 1; and
    memory coupled to the memory bus;
    wherein the data processing system is configured to automatically take at least one remedial measure in response to a positive PMAD indicator; and
    wherein the at least one remedial measure comprises at least one action from the group consisting of:
        waking up the data processing system;
        causing the data processing system to reboot; and
        shutting off power to the memory.

3. A data processing system comprising:
    a semiconductor package according to claim 1;
    a memory bus according to claim 1; and
    memory coupled to the memory bus;
    wherein the data processing system is configured to automatically display a PMAD notice, in response to a positive PMAD indicator.

4. A data processing system comprising:
    a semiconductor package according to claim 1;
    a memory bus according to claim 1;
    memory coupled to the memory bus;
    a processing core in communication with the memory controller;
    a power management unit (PMU) in communication with the memory controller; and
    a manageability engine (ME) in communication with the memory controller, and wherein:
        the integrated circuit comprises the memory controller;
        the memory controller comprises the MADM;
        the MADM is configured to generate the PMAD indicator by causing a PMAD register in the data processing system to be set with the PMAD indicator; and
        the PMAD register comprises at least one register in at least one component from the group consisting of the memory controller, the PMU and the ME.

5. A semiconductor package according to claim 1, wherein the MADM is configured to generate the PMAD indicator by performing at least one action from the group consisting of:
   sending the PMAD indicator as a signal on an output unit of the MADM; and
   causing a PMAD register in the data processing system to be set with the PMAD indicator.

6. A semiconductor package according to claim 1, wherein:
   the integrated circuit comprises the memory controller;
   the memory controller comprises the MADM;
   the memory controller comprises the PMAD register; and
   the MADM is configured to generate the PMAD indicator by causing the PMAD register to be set with the PMAD indicator.

7. A semiconductor package according to claim 1, wherein:
   the integrated circuit comprises the memory controller;
   the memory controller comprises the MADM;
   the memory controller comprises a PMAD register; and
   the MADM is configured to generate the PMAD indicator by causing the PMAD register in the memory controller to be set with the PMAD indicator.

8. A semiconductor package according to claim 1, wherein:
   the integrated circuit comprises the memory controller;
   the memory controller comprises the MADM;
   the semiconductor package further comprises a processing core, a power management unit (PMU), and a manageability engine (ME) in communication with the memory controller;
   the MADM is configured to generate the PMAD indicator by causing a PMAD register in the data processing system to be set with the PMAD indicator; and
   the PMAD register comprises at least one register in at least one component from the group consisting of the memory controller, the PMU and the ME.

9. A data processing system with technology to detect a memory attack, the data processing system comprising:
   a processing core;
   a memory controller in communication with the processing core;
   a memory bus in communication with the memory controller;
   memory in communication with the memory bus; and
   a memory attack detection module (MADM) in the memory controller, wherein the MADM comprises:
      a first input unit;
      a second input unit; and
      control logic in communication with the first input unit and the second input unit, wherein the control logic is configured to:
         determine, based on a first signal from the first input unit and a second signal from the second input unit, whether the memory bus is carrying a clock enable (CKE) signal of high (H), even though the memory controller is generating the CKE signal of low (L); and
         generate a physical memory attack detection (PMAD) indicator, wherein the PMAD indicator indicates whether the memory bus is carrying the CKE signal of H, even though the memory controller is generating the CKE signal of L.

10. A data processing system according to claim 9, wherein:
    the data processing system is configured to automatically take at least one remedial measure in response to a positive PMAD indicator; and
    the at least one remedial measure comprises at least one action from the group consisting of:
       waking up the data processing system;
       causing the data processing system to reboot; and
       shutting off power to the memory.

11. A data processing system according to claim 9, wherein the data processing system is configured to automatically display a PMAD notice, in response to a positive PMAD indicator.

12. A data processing system according to claim 9, wherein the MADM is configured to generate the PMAD indicator by performing at least one action from the group consisting of:
    sending the PMAD indicator as a signal on an output unit of the MADM; and
    causing a PMAD register in the data processing system to be set with the PMAD indicator.

13. A data processing system according to claim 9, wherein:
    the memory controller comprises a PMAD register; and
    the MADM is configured to generate the PMAD indicator by causing the PMAD register in the memory controller to be set with the PMAD indicator.

14. A data processing system according to claim 9, further comprising:
    a power management unit (PMU) in communication with the memory controller; and
    a manageability engine (ME) in communication with the memory controller, and wherein:
       the MADM is configured to generate the PMAD indicator by causing a PMAD register in the data processing system to be set with the PMAD indicator; and
       the PMAD register comprises at least one register in at least one component from the group consisting of the memory controller, the PMU and the ME.

15. A method for detecting a memory attack, the method comprising:
    at a memory attack detection module (MADM) of a data processing system, automatically determining, based on a first signal and a second signal, whether a memory bus in the data processing system is carrying a clock enable (CKE) signal of high (H), even though a memory controller in the data processing system is generating the CKE signal of low (L); and
    generating a physical memory attack detection (PMAD) indicator, wherein the PMAD indicator indicates whether the memory bus is carrying the CKE signal of H, even though the memory controller is generating the CKE signal of L.

16. A method according to claim 15, further comprising:
    automatically taking at least one remedial measure in response to a positive PMAD indicator, wherein the at least one remedial measure comprises at least one action from the group consisting of:
       waking up the data processing system;
       causing the data processing system to reboot; and
       shutting off power to the memory.

17. A method according to claim 15, further comprising:
    automatically displaying a PMAD notice, in response to a positive PMAD indicator.

18. A method according to claim 15, wherein the MADM generates the PMAD indicator by causing a PMAD register in the memory controller to be set with the PMAD indicator.

19. A method according to claim 15, wherein:
the MADM generates the PMAD indicator by causing a PMAD register in the data processing system to be set with the PMAD indicator; and
the PMAD register comprises at least one register in at least one component from the group consisting of the memory controller, a power management unit (PMU) in communication with the memory controller, and a manageability engine (ME) in communication with the memory controller.

20. A method according to claim 15, wherein the MADM generates the PMAD indicator by performing at least one action from the group consisting of:
sending the PMAD indicator as a signal on an output unit of the MADM; and
causing a PMAD register in the data processing system to be set with the PMAD indicator.

* * * * *